(12) United States Patent
Bussani et al.

(10) Patent No.: US 7,349,948 B2
(45) Date of Patent: Mar. 25, 2008

(54) METHOD, NETWORK AND NETWORK PROXY FOR TRANSMITTING INFORMATION

(75) Inventors: Anthony Bussani, Adliswil (CH); Sean Rooney, Zurich (CH)

(73) Assignee: International Business Machines Corporation, Armonk, NY (US)

( * ) Notice: Subject to any disclaimer, the term of this patent is extended or adjusted under 35 U.S.C. 154(b) by 867 days.

(21) Appl. No.: 10/324,376

(22) Filed: Dec. 19, 2002

(65) Prior Publication Data

US 2003/0163520 A1 Aug. 28, 2003

(30) Foreign Application Priority Data

Feb. 28, 2002 (EP) ................... 02004632

(51) Int. Cl.
*G06F 15/16* (2006.01)
(52) U.S. Cl. .................... 709/217; 709/225
(58) Field of Classification Search ........ 709/201–202, 709/217, 218, 225, 238, 245
See application file for complete search history.

(56) References Cited

U.S. PATENT DOCUMENTS

| | | | |
|---|---|---|---|
| 6,360,265 B1 * | 3/2002 | Falck et al. ................ 709/227 |
| 6,697,377 B1 * | 2/2004 | Ju et al. ..................... 370/466 |
| 6,760,694 B2 * | 7/2004 | Al-Kazily et al. ............ 704/2 |
| 6,970,935 B1 * | 11/2005 | Maes ......................... 709/230 |
| 7,007,062 B1 * | 2/2006 | Serenyi et al. .............. 709/203 |
| 7,043,564 B1 * | 5/2006 | Cook et al. ................. 709/246 |
| 7,123,613 B1 * | 10/2006 | Chawla et al. ............. 370/389 |

* cited by examiner

*Primary Examiner*—Bunjob Jaroenchonwanit
*Assistant Examiner*—Van Kim T Nguyen
(74) *Attorney, Agent, or Firm*—Ido Tuchman; Michael J. Chang, LLC

(57) ABSTRACT

The invention is directed to a method of transmitting data information and control information each having a source address and a destination address, from a server, having a server address, to a client, having a client address. The method comprises the steps of transmitting the control information from the server to the client via a network proxy that has a network proxy address, and transmitting the data information from the server to the client not via the network proxy. This system has the advantage that, on one hand, the data information is transmitted directly and therefore without any additional delay due to the network proxy, so that the throughput of the data information is maintained. In particular, a video stream can be sent over the network under real-time conditions. Additionally and on the other hand, the invention provides the advantages achievable by using a network proxy. In particular, the functions offered by a network proxy may still be available in connection with a continuous media service. For example the server providing the media stream may change over time without the client noticing the change. This allows e.g. load-balancing during stream transmission without perturbation at the client side.

9 Claims, 1 Drawing Sheet

METHOD, NETWORK AND NETWORK PROXY FOR TRANSMITTING INFORMATION

The invention relates to a method of transmitting information, in particular continuous media, from a server to a client.

TECHNICAL FIELD AND BACKGROUND OF THE INVENTION

It is known to transmit information within a computer network via a so-called network proxy. A network proxy is an entity which is located within the computer network between a client system and a server system. The purpose of the network proxy is to perform specific tasks within the computer network, e.g. load-balancing by forwarding packets to the least loaded server system, or security checking by allowing access only to authenticated users, or caching or the like.

The network proxy may be software-implemented in an application layer or other layer of the computer network. As well, the network proxy may be hardware-realized in a forwarding device itself. In particular in the first case, the throughput of packets is decreased and perturbed so that a continuous media service like a video stream suffers from jitter if transmitted across a software-based network proxy. Therefore, such continuous media cannot be transmitted via a software-based network proxy without degradation of the data stream. Hardware solutions are more efficient but are less easily altered.

According to one aspect of the present invention there is provided a method for transmitting data information and control information from a server to a client.

According to another aspect of the invention a network comprising a client, a server, and a network proxy is provided wherein the server is set up for transmitting to the client data information and control information, wherein the control information is transmitted from the server to the client via the network proxy, and the data information is transmitted from the server to the client not via the network proxy.

According to another aspect of the invention a network proxy is provided being adapted to receive from the server the control information, the network proxy being furthermore adapted to control a network address translator that is adapted to receive from the server data information, wherein the controlling of the network address translator has the effect that the data information is transmitted to the client not via the network proxy.

SUMMARY OF THE INVENTION

The invention is directed to a method of transmitting data information and control information each containing a source address and a destination address, from a server, having a server address, to a client, having a client address. The method comprises the steps of transmitting the control information from the server to the client via a network proxy that has a network proxy address, and transmitting the data information from the server to the client not via the network proxy.

The invention is furthermore directed to a network comprising a client, having a client address, a server, having a server address, and a network proxy, having a network proxy address, said server being set up for transmitting to said client data information and control information, each containing a source address and a destination address, wherein said control information is transmitted from said server to said client via said network proxy, and said data information is transmitted from said server to said client not via said network proxy.

Furthermore the invention is directed to a network proxy being connected to a client, having a client address, and to a server, having a server address, said network proxy being adapted to receive from said server control information, containing a source address and a destination address, and said network proxy being furthermore adapted to control a network address translator that is adapted to receive from said server data information, also containing a source address and a destination address, wherein said controlling of said network address translator effectuates that said data information is transmitted to said client not via said network proxy.

All the figures are for sake of clarity not shown in real dimensions, nor are the relations between the dimensions shown in a realistic scale.

DETAILED DESCRIPTION OF EMBODIMENTS OF THE INVENTION

A continuous media service like the service of transmitting a video stream or a voice stream comprises two different types of information, i.e. data information D and control information C. These two types of information are exchanged between a client 2 and a server 3, that are connected to each other via a computer network that comprises a network proxy 1. The computer network might be the Internet or a part of it.

The data information D comprises the content of the video stream, whereas the control information C e.g. comprises messages like "start", "stop", "alter the encoding rate" or the like. Different transport protocols can be used for transmitting the data information D and the control information C. For example with the so-called Real Time Streaming Protocol (RTSP), the Real Time Protocol/User Datagram Protocol (RTP/UDP) can be used for the data information D and the Transmission Control Protocol (TCP) can be used for the control information C. Also, any other kind of protocol separating the transmission of data information D and control information C may be used.

Figure 1A:
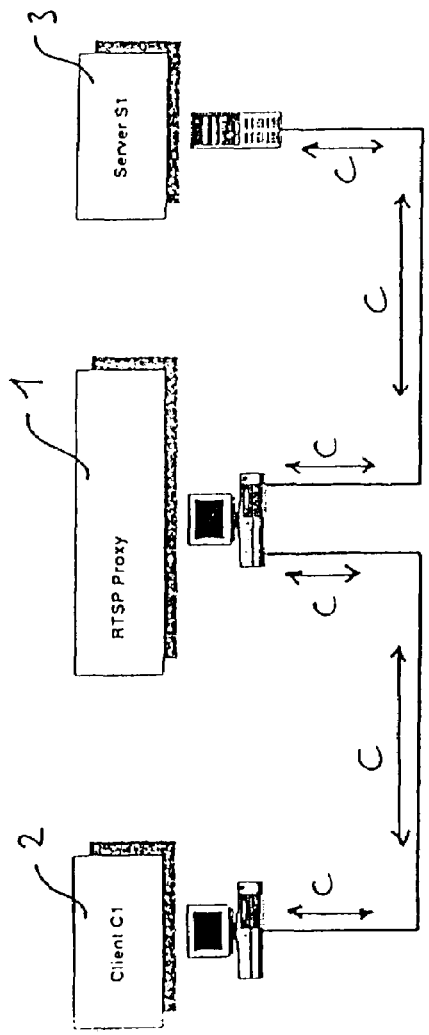
FIG. 1a shows a client and a server within a computer network exchanging control information.

As shown in FIG. 1a, the control information C is passed from the client 2 via the network proxy 1 to the server 3 and vice versa. The network proxy 1 is here based on RTSP and is implemented in the application layer. The data information D is not transported via this network proxy 1, also referred to as RTSP proxy.

Figure 1B:
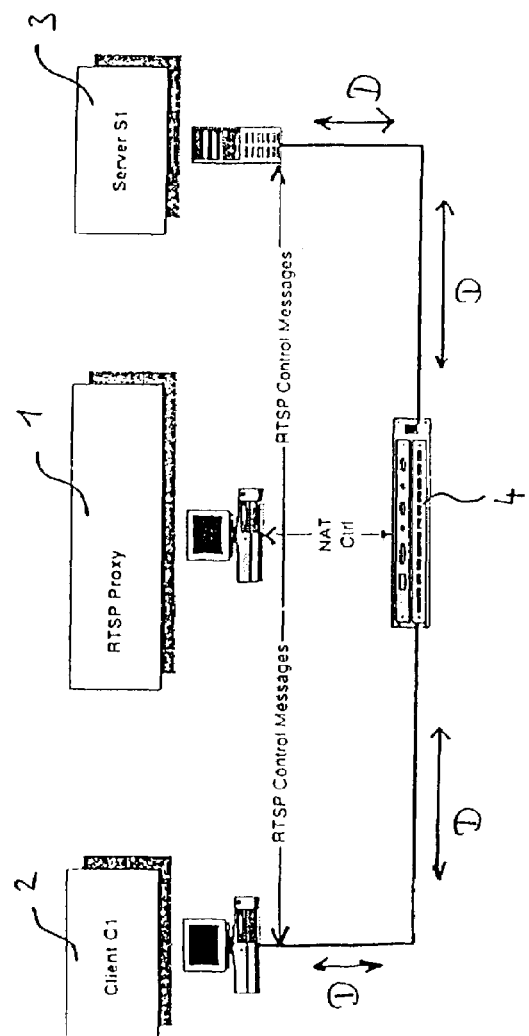
FIG. 1b shows a client and a server within a computer network exchanging data information.

As shown in FIG. 1b, the data information D is instead transmitted directly from the server 3 to the client 2 under the control of a network address translator 4 (NAT). For that purpose, the server 3 sends the stream of packets of the data information D to the NAT 4. The NAT 4 receives these data packets and translates the destination address such that it is that of the client 2. Then, the NAT 4 sends the data packets to the client 2. The NAT 4 is controlled by the network proxy 1.

Furthermore, RTSP control messages are transmitted between the server 3, the client 2 and the network proxy 1.

Due to the use of the NAT 4 and due to the control of the NAT 4 by the network proxy 1, the client 2 and the server 3 have the impression that all information, i.e. the data information D and the control information C, are passed via the network proxy 1. In other words, the client 2 and the server 3 do not become aware of the fact that the data information D is transmitted directly between the client 2 and the server 3. This means that from the perspective of the server 3 and of the client 2, the signaling, data processing and transmission and controlling is identical to the case if the data information D and the control information C were transmitted over the network proxy 1.

An advantage of the described method and arrangement is the possibility to use known protocols without any modification at the client or the server. Furthermore, by providing a dual hardware and software proxy 1, the server 3 can be replaced during an actual transmission of a video stream without the client 1 being informed about that, e.g. in a case of overload.

It is now assumed that a server software is present on the server 3 for transmitting the data information D over the network, and that a client software is present on the client 2 for playing the data information D to a user. The player software sends a setup message to the network proxy 1 via a first TCP connection between the client 2 and the proxy 1. This setup message comprises as transmission information a Uniform Resource Locator (URL) of a video stream and a number of one or several UDP ports in which the player software is prepared to receive the data information D of the video stream.

The network proxy 1 forwards the setup message to the server 3 which is addressed by the URL via a second TCP connection. The client 2, therefore, views the network proxy 1 as a server and the server 3 views the network proxy 1 as a client.

Furthermore, in response to the setup message, the network proxy 1 configures the NAT 4 such that the address sections of all data packets received by the NAT 4 from the server 3 are translated and thereby the packets are sent by the NAT 4 to the UDP ports of the client 2. The distinction between the control information C and the data information D is possible by utilizing the different port number and/or protocol difference of the packets. This means that packets arriving at the NAT 4 and being identifiable as control information will be directed through to the network proxy 1 whereas those packets that arrive at the NAT 4 that are identifiable as data information D will be subjected to address translation and bypass the network proxy 1, being transmitted directly to the client 2.

For starting the transmission of the video stream, a "play" message is sent by the client 2 to the server 3. During transmission of the data packets, each data packet sent by the server 3 towards the client 2 is altered such that it appears to the client 2 to have been sent by the network proxy 1. In particular, the source address and the destination address of that data packet are changed, and the packet header checksum is recalculated.

The data packets arriving at the NAT 4 from the server 3 will bear the server address as source address and the network proxy address as destination address. This is altered in the NAT 4 such that the new destination address is the client address and the new source address is the network proxy address.

For finishing the transmission of the video stream, a corresponding "down" message is sent by the client 2 to the network proxy 1 upon which the network proxy 1 will remove the network address translation settings from the NAT 4. That has the effect that any future communication, regardless of the type of information that is being exchanged, between the client 2 and the server 3 is performed again via the network proxy 1 unless a new NAT setting is established.

For a realization of the above described, both, the control information C and the data information D are both directed from the server 3 towards the network proxy, using as destination address the network proxy address. The information reaches the NAT 4 and therein is split up into that information that is to be directed towards the client 2 via the network proxy 1, and that information that bypasses the network proxy 1 and hence is sent directly to the client 2, not using the network proxy 1. The address translation therein effectuates that at the server 3 as well as at the client 2 the addresses are present as if the network proxy 1 were also used for the data information D. The NAT 4 hence provides a switch for the data information D and the control information C. The switch can be operated using the used protocol, since typically a different protocol is used for the data information D than for the control information C. Additionally or alternatively the port number carried in the packets can be used, since typically for the control information C a different port number is used than for the data information D. The decision on which criterion to switch is communicated to the NAT by the network proxy 1. The network proxy 1 again receives such information from the server 3.

The above method was described for a unidirectional information flow, but of course it is also applicable for an information flow from the client 2 to the server 3, and also for bidirectional continuous media flows such as video conferencing. This means that of course any data packet sent by the client 2 towards the server 3 is then translated by the NAT 4 in the inverse manner.

Hence a method is provided of transmitting information, e.g. over a computer network, under continuation of the functionality of the network proxy 1. The information can e.g. be a continuous media stream. The control information C is transmitted between the server 3 and the client 2 via the network proxy 1, whereas the data information D of the continuous media is transmitted from the server 3 to the client 2, bypassing the proxy 1.

The invention has the advantage that, on one hand, the data information D, i.e. the content of the continuous media, is transmitted directly and therefore without any additional delay due to the network proxy 1, so that the throughput of the data information D is maintained to establish a continuous media service. In particular, a video stream can be sent over the network under real-time conditions. Additionally and on the other hand, the invention provides the advantages achievable by using a network proxy 1. In particular, the functions offered by a network proxy 1 may still be available in connection with the continuous media service. For example the server providing the media stream may change over time without the client noticing the change. This allows e.g. load-balancing during stream transmission without perturbation at the client side.

In an advantageous embodiment of the invention, the addresses relating to the transmission of the data information D between the server 3 and the client 2 are translated such that at the side of the server 3 and also at the side of the client 2, the transmission parameters are practically identical to as they would be if the data information D were also transmitted via the network proxy 1. As a result, at the client 2 and the server 3 there is no notion of the fact that the data information D, i.e. the contents of the continuous media, is transmitted directly from the server 3 to the client 2. The transmission scheme is hence transparent to the client 2 and the server 3.

This transparency can be preferably achieved by using the network address translator for translating addresses of the information. The network address translator therefore comprises translation information that provides for an address translation of the data information D. The control information C does not need such translation since it is anyway addressed to be transmitted via the network proxy 1. The network address translator comprises a switch, respectively switching functionality that recognizes whether the arriving information is data information D or control information C, and only provides for a translation of the address of the data information D. The translation information can be introduced into the network address translator by the network proxy 1. The network proxy 1 can itself receive the translation information or derive it from information that it receives from the server 3 or from the client 2. Thereby the server 3 and/or the client 2 can control the translation step.

It is advantageous if the translation of the addresses is controlled by the network proxy 1 because thereby the network proxy 1 is able to control the transmission of the control information C as well as of the data information D between the server 3 and the client 2.

Setting the destination address of the control information C to be the same as the destination address of the data information D has the advantage that all such information is perceivable as if it were handled by the same entity, in particular the network proxy 1.

It is of further advantage to translate or provide control information C for translating the destination address of the data information D to be the client address. This means that e.g. the server 3 can provide the controlling of the network address translation via the network proxy 1, by sending the corresponding address translation information, such as the protocols used, or the ports used.

Translating or providing control information C for translating the source address of the data information D to be the network proxy address has the advantage that the identical source addresses provide a transparency of the proxy-bypassing method also from the receiver side, i.e. the client 2.

When the control information C and the data information D are transmitted under use of different protocols, in the Real Time Protocol/User Datagram Protocol RTP/UDP for the data information D and the Transmission Control Protocol TCP for the control information C, this difference is advantageously usable for differentiating between the data information D and the control information C. This differentiation can be used for deciding which information to transmit via the network proxy 1 and which information to not send via the network proxy 1.

The network address translator 4 is a preferred embodiment for translating the destination address of the data information D to be the client address and/or translating the source address of the data information D to be the network proxy address, the network address translator 4 preferably being controllable by the network proxy 1.

The present invention can be realized in hardware, software, or a combination of these. Also, it can be implemented in a centralized fashion on one single computer system, or in a distributed fashion where different elements are spread across several interconnected computers or computer systems, whereby any kind of a computer system—or other apparatus adapted for carrying out the methods described herein—is suited. A typical combination of hardware and software could be a general purpose computer system with a computer program that, when being loaded and executed, controls the computer system such that it carries out the methods described herein. The present invention can also be embedded in a computer program product, which comprises all the features enabling the implementation of the methods described herein, and which—when loaded in a computer system—is able to carry out these methods.

Computer program means or computer program in the present context mean any expression, in any language, code or notation, of a set of instructions intended to cause a system having an information processing capability to perform a particular function either directly or after either or both of the following a) conversion to another language, code or notation; b) reproduction in a different material form.

Any disclosed embodiment may be combined with one or several of the other embodiments shown and/or described. This is also possible for one or more features of the embodiments. A person skilled in the art can modify the shown arrangements in many ways without departing from the scope of the invention.

The invention claimed is:

1. A method for transmitting data information and control information, each containing a source address and a destination address, from a server, having a server address, to a client, having a client address, the method comprising
    transmitting said control information from said server to said client via a network proxy that has a network proxy address,
    transmitting said data information from said server to said client so as to bypass said network proxy, translating the destination address of the data information by a network address translator to be the client address, and
    translating the source address of the data information by said network address translator to be the network proxy address,
wherein the steps of transmitting said control information and transmitting said data information are transparent to said server and to said client, such that said server and said client have an impression that both the steps of transmitting said control information and transmitting said data information occur via said network proxy and wherein the steps of translating the destination address of the data information and translating the source address of the data information are controlled by said network proxy.

2. The method of claim 1, further comprising the step of setting the destination address of the control information to be the same as the destination address of the data information.

3. The method of claim 1, further comprising the step of providing control information for translating the destination address of the data information to be the client address.

4. The method of claim 1, further comprising the step of providing control information for translating the source address of the data information to be the network proxy address.

5. The method of claim 3, further comprising the step of controlling the address translation via the network proxy.

6. The method of claim 1, further comprising the step of transmitting the control information and the data information under use of different protocols, the Real Time Protocol/User Datagram Protocol (RTP/UDP) for the data information and the Transmission Control Protocol (TCP) for the control information.

7. A network comprising a client, having a client address, a server, having a server address, and a network proxy, having a network proxy address, said server being set up for transmitting data information and control information to said client, said data information and control information containing a source address and a destination address, wherein said control information is transmittable from said server to said client via said network proxy, and said data information is transmittable from said server to said client the network further comprising a network address translator for translating the destination address of the data information to be the client address and translating the source address of the data information to be the network proxy address, said network address translator being controlled by the network proxy, so as to bypass said network proxy, and wherein said control information and said data information are transmittable in a manner that is transparent to said server and to said client, such that said server and said client have an impression that both said control information and said data information are transmittable via said network proxy.

8. A network proxy being connected to a client, having a client address, and to a server, having a server address, said network proxy being adapted to receive from said server control information, containing a source address and a destination address, and said network proxy being furthermore adapted to control a network address translator that is adapted to receive from said server data information, wherein said network address translator is adapted to translate the destination address of the data information to be the client address and the source address of the data information to be the network proxy address, and also containing a source address and a destination address, wherein by means of said controlling of said network address translator said data information is transmittable to said client so as to bypass said network proxy, and wherein said control information and said data information are transmittable in a manner that is transparent to said server and to said client, such that said server and said client have an impression that both said control information and said data information are transmittable via said network proxy.

9. A computer program product comprising program code means stored on a computer-readable medium for performing a method according to claim 1.

* * * * *